United States Patent [19]

Brabson, Jr. et al.

[11] 3,770,503
[45] Nov. 6, 1973

[54] TWO COMPARTMENTED ELECTROCHEMICAL CELL HAVING ALUMINUM ANODE BUD POWDERED CARBON SUSPENDED IN THE CATHODE COMPARTMENT

[75] Inventors: George Dana Brabson, Jr.; Lowell A. King; David W. Seegmiller; Armand A. Fannin, Jr., all of USAF Academy, Colo.

[73] Assignee: The United States of America as represented by the Secretary of the Air Force, Washington, D.C.

[22] Filed: Mar. 6, 1972

[21] Appl. No.: 231,818

[52] U.S. Cl. ......... 136/6 LF, 136/83 T, 136/100 R, 136/155
[51] Int. Cl. ......................................... H01m 21/14
[58] Field of Search ................ 136/83 T, 83 R, 155, 136/153, 20, 6 LF, 86 E, 86 F, 100 R, 86 A, 90, 112–113

[56] References Cited
UNITED STATES PATENTS
| | | | |
|---|---|---|---|
| 3,632,448 | 1/1972 | Beltzer | 136/86 A |
| 3,650,834 | 3/1972 | Buzzelli | 136/22 |
| 3,671,322 | 6/1972 | King et al. | 136/83 R |

Primary Examiner—Anthony Skapars
Attorney—Harry A. Herbert, Jr. et al.

[57] ABSTRACT

A two compartmented electrochemical cell having an aluminum electrode in one compartment, an inert electrode in the other compartment, an aluminum chloride-sodium chloride electrolyte disposed in both compartments, and powdered carbon suspended only in that portion of the electrolyte disposed adjacent to the inert electrode.

3 Claims, 3 Drawing Figures

TWO COMPARTMENTED ELECTROCHEMICAL CELL HAVING ALUMINUM ANODE BUD POWDERED CARBON SUSPENDED IN THE CATHODE COMPARTMENT

BACKGROUND OF THE INVENTION

This invention relates to a heat-activated electrochemical cell. More particularly, this invention concerns itself with a heat-activated battery that employs an aluminum electrode and a non-aqueous, fusible electrolyte comprising aluminum chloride saturated with sodium chloride.

Recent advances in the field of aerospace technology has added to the burden of maintaining adequate communications between earth orbiting vehicles and their earth-bound control stations. Communications must be maintained on either a continuing or intermittant basis under difficult conditions for extended periods of time. Excessive weight, extended maintenance and limited electrical energy are some of the problems which must be overcome for the proper maintenance of space oriented communication systems. Previously known power supplies using conventional electrode and electrolyte materials have not been found successful in overcoming the problems encountered during the operation of aerospace communication systems.

However, in attempting to provide a solution to the aforementioned problem, it has been found that aluminum is especially suitable as an electrode material particularly when used in combination with a non-aqueous fusible electrolyte. Aluminum is readily available, easily purified, inexpensive, light weight and can be fabricated to almost any shape by conventional metal forming procedures. The problems of self-discharge, aluminum, passivation and aluminum corrosion which were inherent when using aluminum, have been overcome with the use of non-aqueous electrolytes. A non-aqueous electrolyte found to be especially suitable for use with aluminum is a fusible salt mixture composed of aluminum chloride saturated with sodium chloride. A mixture comprising about 40 to 75 mole percent aluminum chloride and about 25 to 60 mole percent sodium chloride has been found to be effective.

SUMMARY OF THE INVENTION

It has been discovered that an unexpected improvement in the operation of an aluminum electrode electrochemical cell can be achieved by a cell which utilizes a non-aqueous, fusible electrolyte composed of aluminum chloride saturated with sodium chloride. The entire cell is filled with the particular electrolyte. It is further divided into two compartments by means of a porous membrane. The first compartment contains an aluminum electrode, while the second compartment contains an inert electrode plus finely divided carbon. The porous membrane permits the free transport of the electrolyte from one compartment to the other.

The cell may be completely sealed and is stored at ambient temperatures when not in use. In order to initiate operation, the temperature of the cell must be raised to a temperature above the melting point of fusible electrolyte. During periods of inactivity, the cell retains its charge. However, as soon as it is reheated to its operating temperature, it is capable of delivering electrical power.

Accordingly, the primary object of this invention is to provide an improved electrochemical cell of the heat-activated type.

Another object of this invention is to provide an electrochemical cell that utilizes the inherent energy content of the chlorine-aluminum reaction in the production of electrical power.

Still another object of this invention is to provide an electrochemical cell that utilizes powdered carbon in suspended form as a means for providing a cathodic element.

A further object of this invention is to provide an electrochemical cell that can utilize the chlorine-aluminum reaction without the need for a separate source of chlorine gas to initiate cell activation.

Still further object of this invention is to provide a low cost, light weight, maintenance free electrochemical power source that is capable of operating either continually or intermittently for extended periods of time.

Still a further object of this invention is to provide a heat-activated electrochemical power source of high energy content that can be activated at relatively low temperatures.

The above and still further objects and advantages of the present invention will become readily apparent upon condition of the following detailed description thereof when taken in conjunction with the accompanying drawing.

DESCRIPTION OF THE PREFERRED EMBODIMENT

Figure 1:
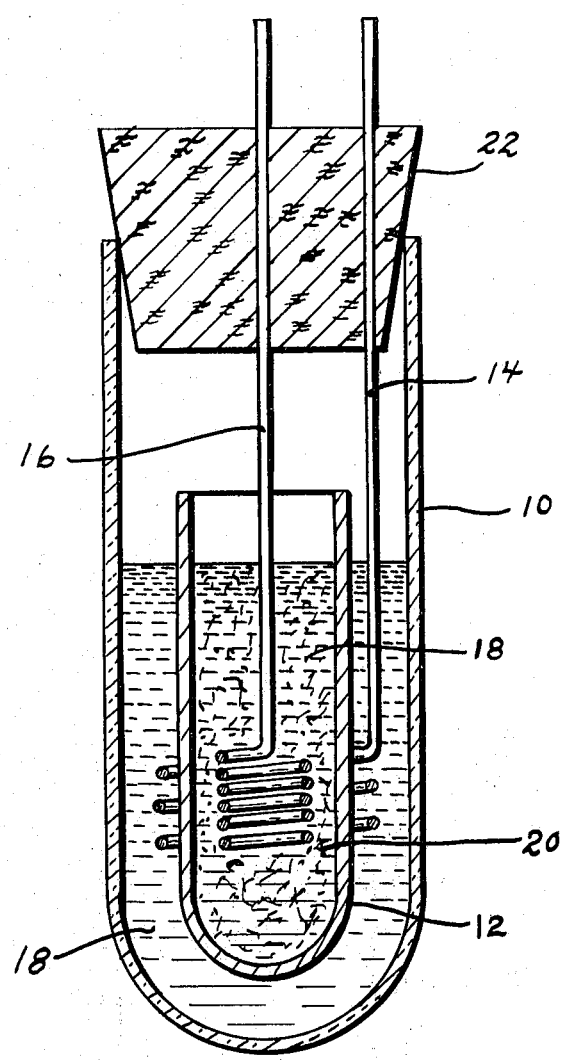
FIG. 1 is a cross-sectional view of an electrochemical cell constructed in accordance with the teachings of this invention.

Pursuant to the objects of this invention, the electrochemical cell comprises a container suitably filled with an electrolyte and divided into two compartments by means of a porous membrane. The first compartment contains an aluminum electrode as the anodic element while the second compartment contains an inert electrode plus graphite powder as the cathodic element. The electrolyte comprises a mixture of aluminum chloride and sodium chloride. The cell may be completely sealed, if desired. It can be stored at ambient temperatures during which time it retains its charge. In order to activate the cell, however, its temperature must be raised to a point above the melting point of the electrolyte. While in its inactive state, the cell retains its charge, but is capable of delivering power as soon as it is reheated to its operating temperature. During operation it has been found that the cell of this invention is capable of achieving an open circuit voltage of approximately 2.5 volts and a theoretical energy density of 685 Watt-hours per pound.

The electrolyte consists of a mixture of powdered aluminum and sodium chlorides having a composition range from about 40 to 75 mole percent aluminum chloride with the balance sodium chloride. Preferably, the aluminum chloride is saturated with sodium chloride. There should be a reserve of solid sodium chloride in the bottom of the cell, but there must not be a reserve of solid sodium chloride in the bottom of the chlorine electrode compartment. Generally, a melt composition of about 50 mole percent aluminum chloride and 50 mole percent sodium chloride can be used most successfully.

The porous membrane which separates the cell into two compartments, permits relatively free transport of the sodium ions of the electrolyte from one compartment to the other while simultaneously preventing the rapid equilibration of the electrolyte between the cathode and anode compartments. Apparently, as electrical charging progresses, most of the current between the cathode and anode compartments is carried by sodium ions. The sodium ions migrate from the chlorine electrode compartment into the aluminum electrode compartment. This creates an aluminum chloride rich electrolyte in the chlorine electrode compartment, while the electrolyte in the aluminum electrode compartment remains saturated with sodium chloride. This results in a concentration difference that adds an estimated 0.3 volts to the open circuit potential of the charged cell. Pressed alumina, glass fibers and sintered glass discs have been found suitable for use as electrode separators.

The finely divided carbon serves to trap chlorine gas around the inert electrode in the cathode compartment. This forms a chlorine-type active cathode and allows for the utilization of the large inherent energy content of the chlorine-aluminum reaction in the production of electrical power. The chlorine is electrochemically fixed in useable form at the cathode without the necessity of resorting to an outside source of chlorine gas. Powdered graphite serves most suitably as the chlorine collector.

For the purpose of illustrating an electrochemical cell constructed in accordance with the teachings of this invention, reference is made to FIG. 1 of the drawings wherein there is shown, in schematic form, a cell comprising a suitable container 10. The container 10 is made of an electrical insulating material, such as ceramic, metal or pyrex glass. A porous alumina membrane 12, in the form of a cup or thimble, separates the container into two compartments. The first compartment contains an anode 14, which consists of several turns of aluminum. The second compartment contains a cathode 16 which consists of a spiral of tungsten wire. Both the anode and cathode are immersed in an aluminum chloride-sodium chloride electrolyte 18. Graphite powder 20 is suspended in that portion of the electrolyte 18 located adjacent to the cathode 16 within the cup 12. That portion of the electrolyte 18 found in the anode compartment does not contain any graphite powder. The entire container may be sealed, if desired, by means of a suitable cork stopper 27.

The cell is activated by conventional heating means not shown. A well-stirred, constant temperature, silicone oil bath could be used as a conventional heat source. In typical operation, the cell is heated to about 200°C. As soon as the electrolyte has become molten, charging may begin. The cell is charged by applying a reverse emf of about 3.0 volts to the cell. During the charging process, chlorine becomes fixed in the cathode compartment.

As a means of further illustrating the invention, the following examples are presented as specific embodiments of a cell constructed in accordance with the invention. The various cell parameters are set forth in tabulated form.

EXAMPLE I

Figure 2:
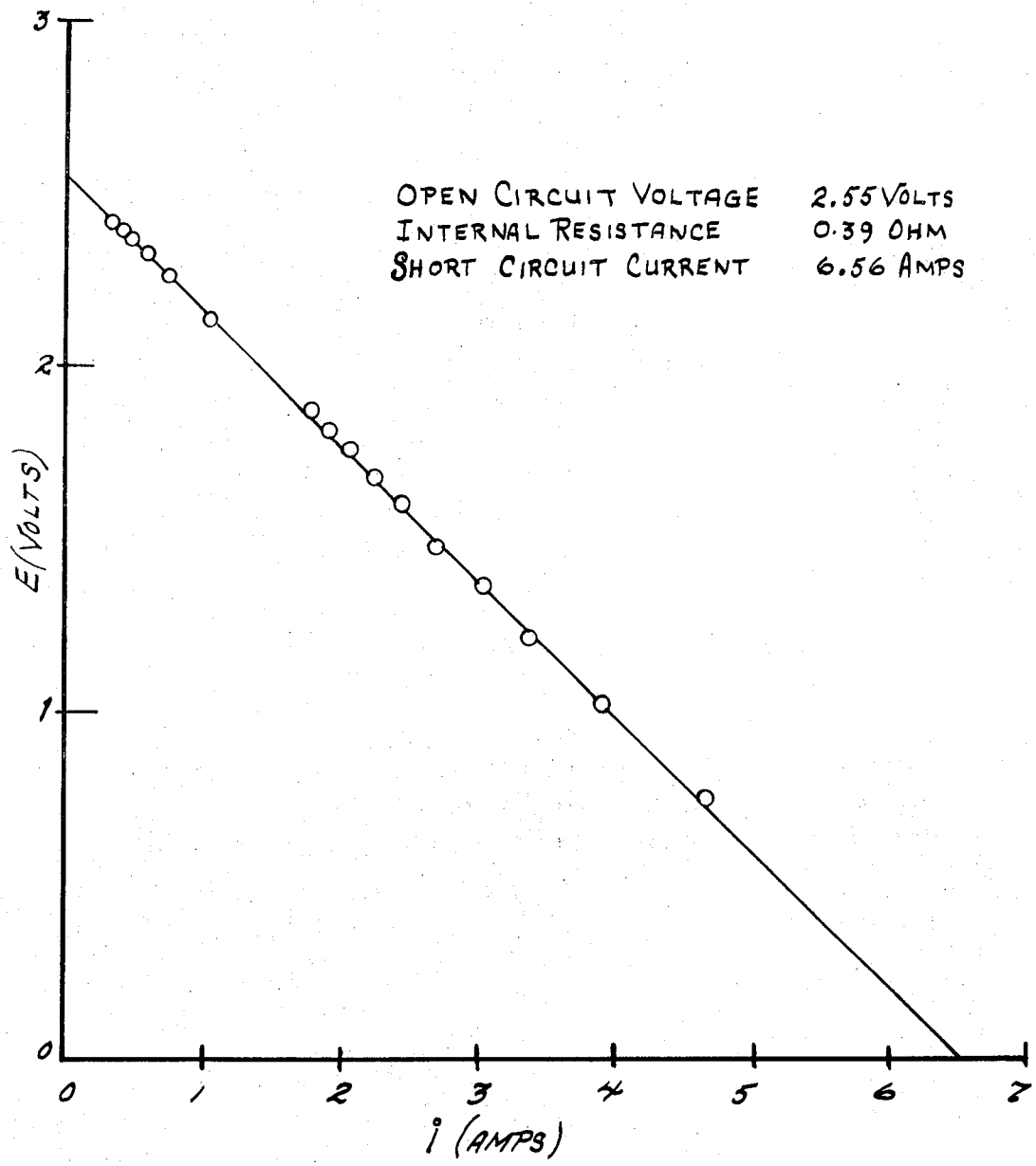
FIGS. 2 and 3 are graphs illustrating the operating results and conditions achieved by the electrochemical cell of this invention.
Figure 3:
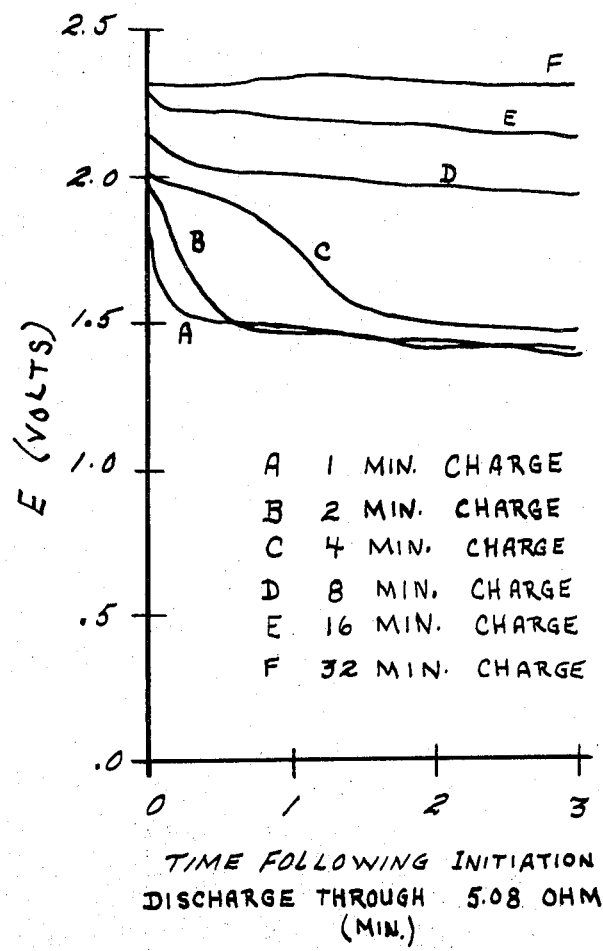

Aluminum electrode: 0.032" diam. "Baker Analyzed" reagent grade wire; length = 1.00 meter.
Tungsten electrode: 0.30" diam. Tungsten wire formed into a spiral coil 12 mm in diameter; total length of tungsten wire in the coil: 43 cm.
Container: Pyrex** glass
Graphite Powder: 4.8 grams, finely powdered; made from large flakes procured from Denver Fire Clay Co.
Separator: Alundum* Filter Thimble, porosity RA-360 medium; OD: 19 mm, length 90 mm.
Electrolyte: Aluminum Chloride saturated with sodium chloride. Initial dry composition: 40.0 gm $AlCl_3$, 20.0 gm NaCl (47 mole percent $AlCl_3$, 53 mole percent NaCl).
Open Circuit Voltage: 2.55 volts. See FIG. 2 of the drawing.
Discharge Parameters as a Function of Charging Time: See FIG. 3 of the drawing.
Power Attainable: 4.18 watts
Current Attainable: 6.56 amps (short circuit).
Temperature of operation: 208°C \* Alundum is the Registered Trade Mark of the Norton Company.
\*\* Pyrex is the Registered Trade Mark of the Corning Glass Works.

EXAMPLE II

A cell similar to that in Example I was constructed except that a platinum wire, rather than tungsten wire, was used as the cathodic element. Several short charge-discharge cycles were completed; at the beginning of the discharge cycle the voltage was greater than 1.8 volts; the voltage rapidly decayed to 1.7 volts, and then decayed more slowly thereafter.

The cell parameters referred to in the examples may be altered without impeding cell operation. For example, the cell described in Examples I and II used an aluminum chloride melt saturated with sodium chloride. However, other melt compositions can be used successfully. For example, cells in which the mole percent of aluminum chloride varies from about 40 to 75 percent with the balance sodium chloride has been found useful. Also, the tungsten cathode can be effectively replaced with a graphite rod for short term operation; substantially the same voltages and current are realized. Materials other than alumina may be used as a separator. For example, a glass fiber filter thimble makes an excellent electrode compartment separator. Glass discs also make good separators provided they are oriented so that void spaces cannot develop at their surfaces. Materials other than powdered graphite can be used to trap the chlorine in the cathode compartment. In one experiment Decolorizing Carbon (Fisher, Nuchar C-190N) was used successfully.

In an experiment designed to determine whether a cell of this invention could hold its charge during a quiescent period at ambient temperature, the charged Example I cell was cooled to room temperature and stored at this temperature for 60 hours. Upon being reheated, the cell developed its formerly displayed voltage and current.

The cells have been used successfully under a variety of temperature conditions; the low temperature limit is determined by the point at which the melt solidifies. Cells of different sizes have been designed and tested.

Both very large and quite small designs appear to be practical.

The present invention provides a low-cost, maintenance-free, long-lasting electrical power source which has been especially useful where excessive weight constitutes a serious operational drawback. It has been found effective as a power supply for space vehicles, earth orbiting satellites, back-pack radios, survival gear transmitters as well as other applications requiring a light weight power supply.

One of the unique features of the cell of this invention is the unexpected enhancement of voltage over that provided by other cells. Apparently, the voltage enhancement is due to the establishment of a concentration gradient in the electrolyte during the electrical charging process. Another unique feature is the ability of the cell to fix chlorine in useable form at the cathodic element without the use of a separate source of chlorine to operate the cell.

While the principles of this invention have been described with particularity, it should be understood that various alterations and modifications can be made without department from the spirit of the invention, the scope of which is defined by the appended claims.

What is claimed is:

1. An electrochemical cell comprising
a container;
a porous membrane positioned within said container to effect a separation thereof into an anode compartment and a cathode compartment;
an aluminum electrode positioned in said anode compartment;
an inert electrode positioned in said cathode compartment;
a solid, fusible electrolyte disposed within each of said compartments, said electrolyte comprising a mixture of aluminum chloride and sodium chloride, and
a chlorine gas collector comprising powdered carbon suspended only in that portion of the said electrolyte disposed within the cathode compartment.

2. An electrochemical cell in accordance with claim 1 wherein said electrolyte consists essentially of a mixture of about 40 to 75 mole percent aluminum chloride and about 60 to 25 mole percent sodium chloride.

3. An electrochemical cell in accordance with claim 1 wherein said electrolyte consists essentially of a mixture of about 47 mole percent aluminum chloride and about 53 mole percent sodium chloride.

* * * * *

UNITED STATES PATENT OFFICE
CERTIFICATE OF CORRECTION

Patent No. 3,770,503          Dated November 6, 1973

Inventor(s) George Dana Brabson, Jr.; Lowell A. King; David W. Seegmiller; Armand A. Fannin, Jr.

It is certified that error appears in the above-identified patent and that said Letters Patent are hereby corrected as shown below:

Page 1, The title should read --TWO COMPARTMENTED ELECTROCHEMICAL CELL HAVING ALUMINUM ANODE AND POWDERED CARBON SUSPENDED IN THE CATHODE COMPARTMENT--;

Page 5, Column 1, The title should read --TWO COMPARTMENTED ELECTROCHEMICAL CELL HAVING ALUMINUM ANODE AND POWDERED CARBON SUSPENDED IN THE CATHODE COMPARTMENT --.

Signed and sealed this 16th day of July 1974.

(SEAL)
Attest:

McCOY M. GIBSON, JR.
Attesting Officer

C. MARSHALL DANN
Commissioner of Patents